United States Patent [19]

Yoshida

[11] Patent Number: 4,904,880

[45] Date of Patent: Feb. 27, 1990

[54] AUTOMATIC DOOR DRIVING SYSTEM

[75] Inventor: Yukio Yoshida, Namerikawa, Japan

[73] Assignee: Yoshida Kogyo K.K., Tokyo, Japan

[21] Appl. No.: 227,794

[22] Filed: Aug. 3, 1988

[30] Foreign Application Priority Data

Aug. 7, 1987 [JP] Japan ............................... 62-197350

[51] Int. Cl.[4] ........................... H02J 7/00; H02P 1/00

[52] U.S. Cl. ........................................ 307/66; 318/441

[58] Field of Search .................. 307/66; 318/441, 442; 49/31

[56] References Cited

U.S. PATENT DOCUMENTS 4,088,937 5/1978 Uchida et al. ....................... 318/441
4,129,811 12/1978 Pearson ............................... 49/31 X
4,490,624 12/1984 Luker .................................... 307/66
4,536,747 8/1985 Jensen ................................. 340/502
4,738,052 4/1988 Yoshida ................................. 49/31

FOREIGN PATENT DOCUMENTS 60-16552 4/1985 Japan .

*Primary Examiner*—William M. Shoop, Jr.
*Assistant Examiner*—Sharon D. Logan
*Attorney, Agent, or Firm*—Hill, Van Santen, Steadman & Simpson

[57] ABSTRACT

An automatic door driving system is disclosed, which can electrically perform automatic door opening/closing operation in case of emergency, i.e., occurrence of a fire, or power stoppage and effect automatic door opening/closing control according to the prevailing situation. In the driving system, an AC power source and battery power source are selectively connected through an emergency battery unit to an automatic door controller for controlling an automatic door drive motor. Normally, electric power is supplied from the AC power source to the automatic door controller, while the battery power source is charged from the AC power source. At the time of power stoppage, electric power is supplied from the battery power source to the automatic door controller.

5 Claims, 8 Drawing Sheets

AUTOMATIC DOOR DRIVING SYSTEM

BACKGROUND OF THE INVENTION

1. Field of the Invention

This invention relates to an automatic door driving system and, more particularly, to an automatic driving system, which permits an automatic door to be opened and closed electrically in case of emergency such as the occurrence of a fire or when power supply is stopped and can also control the opening and closing of the automatic door in accordance with the status of an emergency.

2. Description of the Prior Art

In an automatic door driving system, the automatic door usually can be opened and closed for refuge or fire prevention in case of an emergency such as the occurrence of a fire or when power supply is stopped.

An emergency automatic door driving system for mechanically opening or closing an automatic door in case of emergency is disclosed in Japanese Patent Publication Sho 60-16552.

In the disclosed emergency automatic door driving system, a driven pulley, around which is a chain or the like for driving the automatic door, is provided with a reversely rotatable shaft with a spiral leaf spring rewindingly wound thereon. When an electric power is interrupted in case of emergency, a solenoid is excited so that the driven pulley and the shaft are connected to each other, whereby the automatic door is emergency-opened or -closed by the rewinding force of the spiral leaf spring.

In such a mechanical emergency automatic door driving system, however, the automatic door is mechanically opened or closed by the rewinding force of the spiral leaf spring. Therefore, the door is only opened or closed, i.e., it is driven only in one direction. In addition, it is impossible to control the speed or pattern of opening or closing the door.

SUMMARY OF THE INVENTION

This invention has been intended in the light of the above situation, and its object is to permit the automatic door to be opened and closed electrically in case of an emergency such as the occurrence of a fire or subsequent power stoppage or in case of ordinary power stoppage and can also control the opening and closing of the automatic door according to predetermined programs selectable in dependence on various situations.

To attain the above object of the invention, in one aspect of the invention there is provided an automatic door driving system, in which an AC power source and a battery power source are connected through an emergency battery unit to an automatic door controller for controlling an automatic door drive motor, also in which normally the automatic door controller is supplied with power from the AC power source for normal operation of the automatic door by the function of the automatic door controller, while power supply from the battery power source to the automatic door controller is inhibited and the battery power source is charged from the AC power source, further in which at the time of power stoppage the emergency battery unit is switched for power supply from the battery power source to the automatic door controller so that the automatic door is subjected to normal operation or operation at the time of power stoppage by the function of the automatic door controller, and still further in which in case of emergency such as the occurrence of a fire an external emergency signal is stored so that an emergency operation of the automatic door will be caused according to a predetermined program by the function of the automatic door controller, and the emergency signal and a power stoppage signal are outputted to the automatic door controller.

In a second aspect of the invention, there is provided an automatic door driving system, in which the emergency battery unit includes an AC power source circuit for electrically connecting the AC power source and automatic door controller to each other, a first relay provided in the AC power source circuit such as to be turned off at the time of power stoppage, a battery power source circuit for electrically connecting the battery power source and automatic door controller to each other through a switch to be turned on when the first relay is rendered inoperative, a rectifier, a constant current circuit, a switch to be turned on when a first signal circuit outputs a fire signal, the rectifier, constant current circuit and switch being serially provided between the AC power source circuit and battery power source circuit, a fire signal circuit for outputting a fire signal according to external situation at the time of occurrence of a fire, a self-holding circuit for holding a fire signal outputted from the fire signal circuit, and various signal output means for providing the operational state of the emergency battery unit to the automatic door controller.

In a third aspect of the invention, there is provided an automatic door driving system, in which the battery power source circuit in the automatic door driving system in the second aspect noted above includes a selection switch.

In a fourth aspect of the invention, there is provided an automatic door driving system, in which the self-holding circuit in the automatic door driving system in the second aspect includes inner and outer reset buttons.

In a fifth aspect of the invention, there is provided an automatic door driving system, in which the fire signal circuit in the automatic door driving system in the second aspect includes a test button.

The above and other objects, aspects and advantages of the invention will become apparent to one skilled in the art from the following description of a preferred embodiment of the invention illustrating the principles underlying the invention when the same is read with reference to the accompanying drawings.

DETAILED DESCRIPTION OF THE PREFERRED EMBODIMENTS

Now, the invention will be described in detail with reference to the accompanying drawings.

Figure 1:
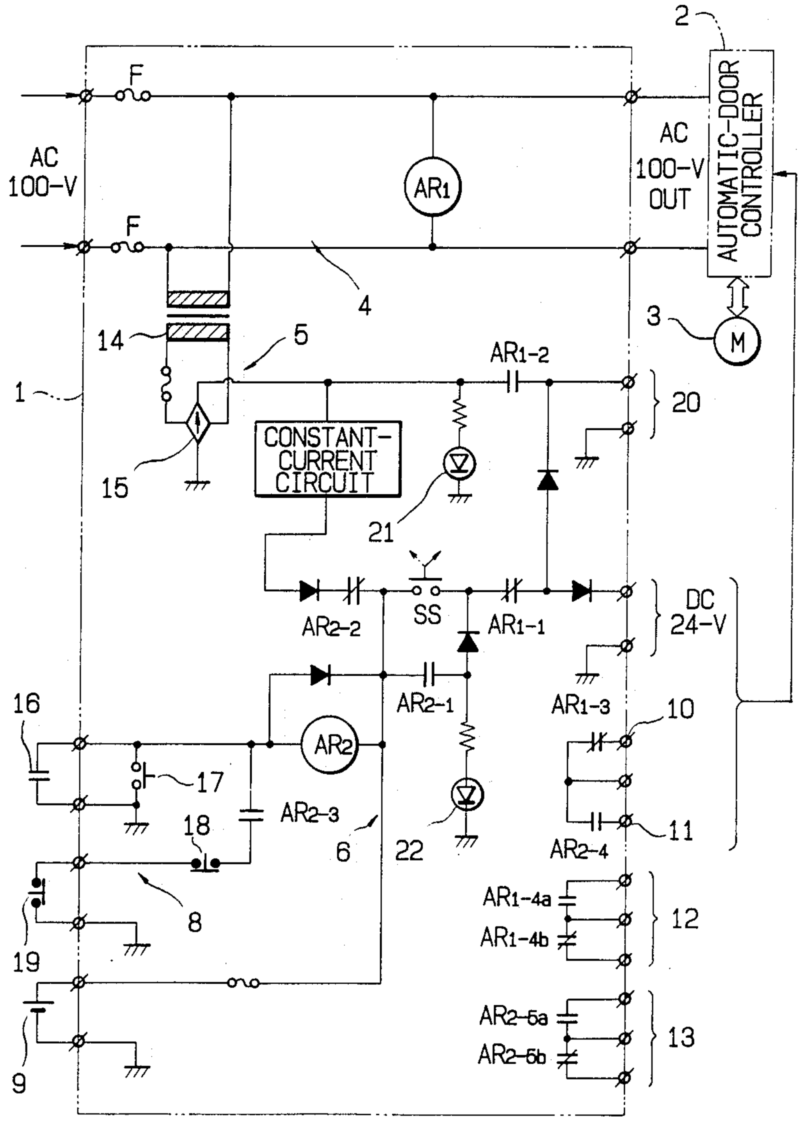
FIG. 1 is an electric circuit schematically showing an embodiment of the invention.

As shown FIG. 1, the system for driving an automatic door (not shown) according to the invention comprises an emergency battery unit 1 and an automatic door controller 2 for controlling an automatic door drive motor 3.

The emergency battery unit 1 includes an AC power source circuit, in which an AC power source and an automatic door controller 2 are electrically connected to each other by a first relay $AR_1$ to be turned off at the time of power stoppage, a battery power source circuit 6, in which a battery power source 9 and the automatic door controller 2 are electrically connected to each other by a switch $AR_{1-1}$ to be turned on when the first relay $AR_1$ is turned off at the time of power stoppage, a rectifier 5, a constant current circuit and a normally-closed switch $AR_{2-2}$ serially provided between the AC power source circuit 4 and battery power source circuit 6, a fire signal circuit 7 connected to the battery power source circuit 6 through a second relay $AR_2$, which outputs a fire signal depending on the external situation in case of emergency such as the occurrence of a fire, is normally "off" and is turned on when providing the fire signal, a self-holding circuit 8 for holding the fire signal outputted by the fire signal circuit 7 and various signal output means including power stoppage and fire signal output units 10 and 11 for providing the operational state of the emergency battery unit 1 to the automatic door controller 2 and power stoppage and fire switch output units 12 and 13 for providing the operational state of the emergency battery unit to illumination lamps at the time of power stoppage and siren.

The rectifier 5 includes a transformer 14 and a bridge circuit 15, and its output side is connected through a switch $AR_{1-2}$ to a sensor 20. The switch $AR_{1-2}$ is normally "on" and is turned off when the first relay $AR_1$ is turned off at the time of power stoppage.

A selection switch SS connected to the battery power source circuit 6 effects selection as to whether the AC power source is to be switched over the battery power source at the time of power stoppage. To the battery power source circuit 6 are also connected a switch (normally-"on" switch) $AR_{1-1}$ of the first relay $AR_1$ of the AC power source circuit 4 and a switch (normally-"off" switch) $AR_{2-1}$ of the second relay $AR_2$ of the self-holding circuit 8. As will be described later, normally the battery power source 9 is charged from the AC power source without any power supplied from it to the automatic door controller 2 because the switch $AR_{2-2}$ is on and the switch $AR_{1-1}$ is off. In case of ordinary power stoppage or power stoppage due to occurrence of a fire, the AC power source supplying power to the automatic door controller 2 is automatically switched over to the battery power source 9 because the switch $AR_{2-2}$ is turned off by receiving a fire signal issued from the fire signal circuit 7 and the switch $AR_{1-1}$ is turned on. The automatic door thus is driven by the battery power source 9 to execute operation at the time of power stoppage or normal operation as will be described later.

The fire signal circuit 7 includes an external heat or smoke sensor 16. When this sensor is turned on at the time of occurrence of a fire, the fire signal circuit 7 outputs a fire signal and a fire switch signal. Reference numeral 17 designates a test button, which is provided in the fire signal circuit 7 and used when testing the operation of the emergency battery unit 1 at the time of occurrence of a fire.

The self-holding circuit 8 includes an internal reset button 18 and an external reset button 19. One of these reset buttons is selectively depressed for causing vanishment of the fire signal and fire switch output outputted to the emergency battery unit after the operation test, after extinguishment of a fire or at the time of erroneous operation of the heat or smoke sensor 16.

Reference numerals 21 and 22 designate a power source indicator and a fire signal indicator, respectively.

Now, the operation of the automatic door driving system according to the invention will be described with reference to the flow-charts of FIGS. 2 through 6.

Figure 2:
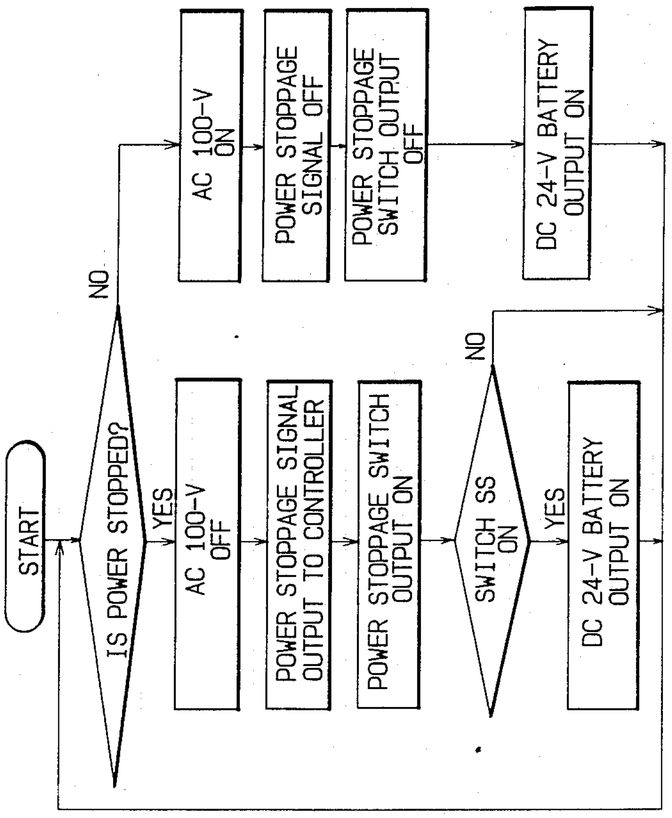
FIGS. 2 and 3 are flow-charts illustrating the operation of the automatic door driving system according to the invention, with FIG. 2 for normal operation and operation at the time of power stoppage and FIG. 3 for operation at the time of a fire, operation at the time of power stoppage and operation at the time of a test.

First, normal operation and operation at the time of power stoppage will be described with reference to FIG. 2.

(1) Normal operation:

Normally, the AC power source is connected for electric power supply to the automatic controller 2 via the AC power source circuit 4 of the emergency battery unit 1.

Since the first relay $AR_1$ is "on", the switch $AR_{1-1}$ is "off", so that no power is supplied from the battery power source 9 to the automatic door controller 2.

Further, since the switch $AR_{2-2}$ is "on", the battery power source 9 is connected through the rectifier 5 and constant current circuit to the AC power source to be charged by the AC power source.

Further, since the switch $AR_{1-2}$ is "on" so that power is supplied from the AC power source to the sensor 20, the normal operation of opening and closing the automatic door is caused by the sensor 20.

(2) Operation at the time of ordinary power stoppage:

When power supply from the AC power source is interrupted by power stoppage, the first relay $AR_1$ is turned off to turn on the switch $AR_{1-3}$ so as to output a power stoppage signal to the automatic door controller 2. At the same time, the power stoppage switch output unit 12 outputs a power stoppage switch output signal to an accessory unit such as illumination lamps (not shown) at the time of the power stoppage.

Further, when the first relay $AR_1$ is turned off, the switch $AR_{1-1}$ is turned off. Thus, if the selection switch SS is held "on" or turned on after the end of the power stoppage, power now is supplied from the battery power source 9 to the automatic door controller 2 and sensor 20.

Thus, with the operation of the battery power source 9 ordinary automatic door opening/closing operation similar to the normal operation or emergency automatic door opening/closing operation, i.e., an operation of fully opening or closing the automatic door according to the power stoppage signal, is performed. The selection of automatic door opening/closing operation depends on the place where the automatic door is mounted. For example, in case of an automatic door provided in a shop, in which an independent power generator is operated after stoppage of power supply from the AC power source, normal opening/closing operation is selected. In case where the system is provided in a place free from any independent power generator and is intended to prevent crimes at the time of power stoppage the fully closing operation is selected. In case where refuge of people in a room is intended, the fully opening operation is selected.

Figure 3:
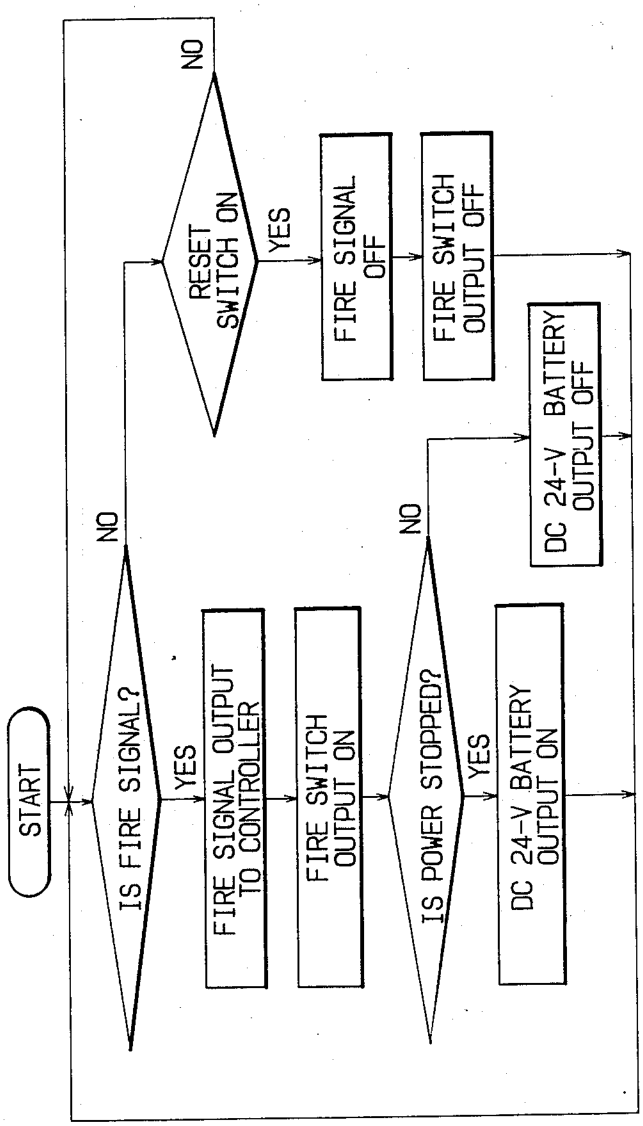

Now, operation at the time of occurrence of a fire and occurrence of power stoppage due to the fire will be described with reference to FIG. 3.

(3) Operation at the time of occurrence of a fire

When the heat or smoke sensor 16 is turned on due to a fire so that a fire signal is outputted from the fire signal output circuit 7, the second relay $AR_2$ is turned on to close the switch $AR_{2\text{-}3}$ so as to render operative the self-holding circuit 8. Thus, the self-holding circuit 8 remains operative even after vanishment of the fire signal. The switch $AR_{2\text{-}4}$ of the fire signal output unit 11 is closed to output a fire signal to the automatic door controller 2, thus causing driving of the door as will be described later. As the same time, the fire switch output unit 13 outputs a fire switch output signal to operate an emergency siren or an emergency lamp (not shown) connected to the unit 13.

Power supply is not always stopped immediately after the appearance of a fire signal, and so long as power is supplied from the AC power source the automatic door is driven from the AC power source for opening/closing operation at the time of occurrence of a fire to be described later. More specifically, when power is not stopped in spite of the appearance of a fire signal, at which time the first and second relays $AR_1$ and $AR_2$ are both "on", the switch $AR_{2\text{-}1}$ is "on" while the switch $AR_{1\text{-}1}$ is "off". Therefore, no power is supplied from the battery power source 9 to the automatic door controller 2.

When power stoppage is subsequently caused due to a fire, the first relay $AR_1$ is turned off to close the switch $AR_{1\text{-}1}$. Meanwhile, the switch $AR_{2\text{-}1}$ has been held closed by the action of the second relay AR since the appearance of the fire signal. Thus, the AC power source is switched over the battery power source 9 for power supply to the automatic door controller 2.

Thus, at the time of the occurrence of a fire, the automatic door driving system according to the invention can selectively effect one of the following automatic door opening/closing operations at the time of the occurrence of a fire in accordance with a predetermined program. The selection at this time, like the case of the ordinary power stoppage as described before, depends on the place, in which the automatic door is mounted.

Figure 4:
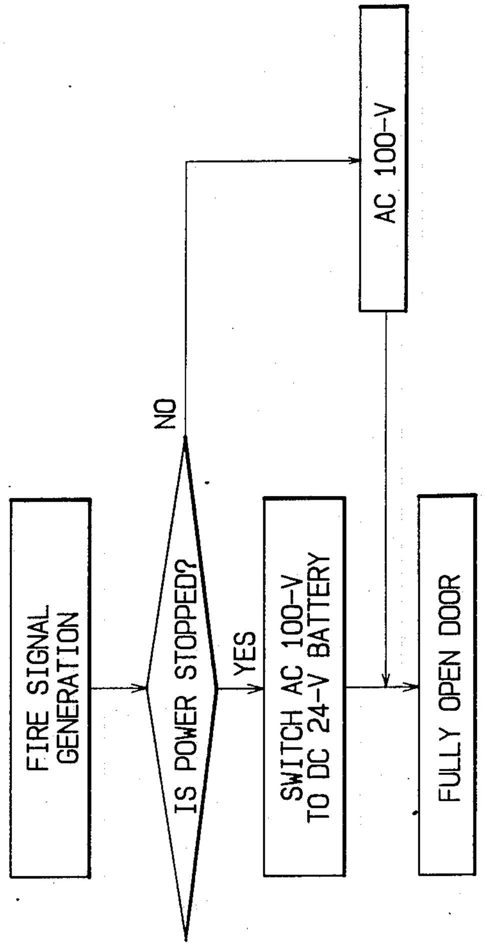
FIGS. 4, 5 and 6 are flow-charts illustrating the operation of the automatic door driving system according to the invention, i.e., operation at the time of a fire, operation at the time of power stoppage and also automatic door opening/closing operation, respectively.

(3-1) Forced opening of door:

As shown in the flow chart of FIG. 4, when a fire signal is received from the emergency battery unit 1 is received, the automatic door is fully opened by the automatic door controller 2 from the AC power source if power supply therefrom is not stopped and from the battery power source if the power supply is stopped.

Thus, people in the room can make a refuge safely and smoothly. The door-opening operation at this time is selected for the refuge of people in preference to everything.

(3-2) Forced low-speed low-thrust opening/closing operation

The automatic door is usually driven by high-speed and high-thrust (about 20 kg) driving in order that it can be opened and closed speedily and also that it can not be opened by the force of a man for crime prevention. Further, at the time of a fire, the flame and sparks desirably do not get out of the door for preventing the spread of the fire. From the standpoint of the refuge and rescue, on the other hand, it is desired that people can freely get into and out of the room. The automatic door operation in this case is provided to meet the above requirements, and it will now be described in detail.

Figure 5:
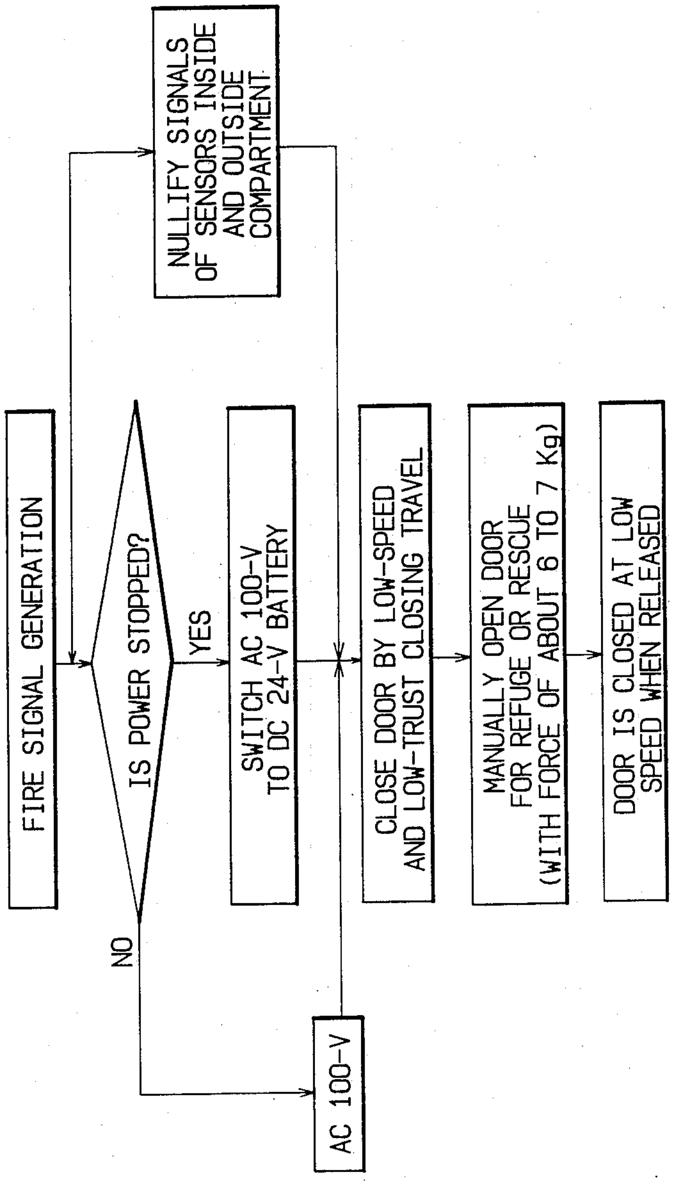
Figure 7:
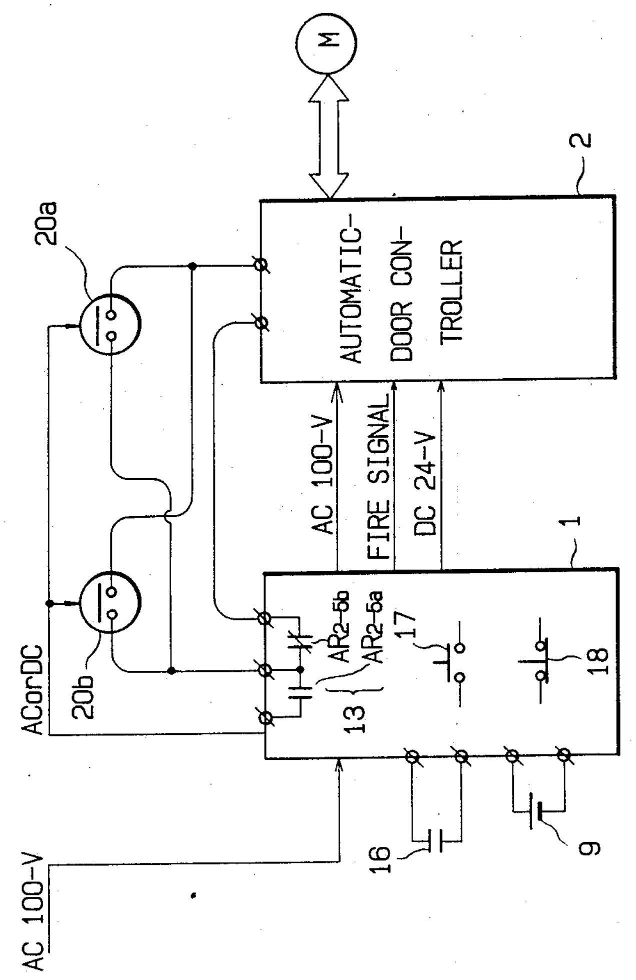
FIGS. 7 and 8 are connection diagrams showing examples of connection of inside and outside sensors related to the operations illustrated in FIGS. 5 and 6, respectively.

As shown in the flow chart of FIG. 5, when a fire signal is supplied, the automatic door controller 2 switches the automatic door driving to a low-speed low-thrust (about 6 to 7 kg) driving according to a predetermined program to close the automatic door for preventing the spread of the fire. At this time, inside and outside sensors 20*a* and 20*b* are connected in a wiring as shown in FIG. 7 between the emergency battery unit 1 and automatic door controller 2, so that with the opening of the switch $AR_{2\text{-}5b}$ of the fire switch output unit 13, the sensors 20*a* and 20*b* are no longer operative. Thus, even is there is a man or an object in the sensor are at the time of the appearance of a fire signal, the automatic door can be reliably closed to perfectly fulfill the fire prevention function.

Further, since the automatic door driving is switched over to the low-speed low-thrust driving, the automatic door being closed or in the closed state can be easily manually opened (with a force of 6 to 7 kg) for refuge or rescue, and also a man will never be injured even when he or she is struck by the automatic door in a closing operation.

(3-3) Low-speed low-thrust opening/closing operation

Figure 6:
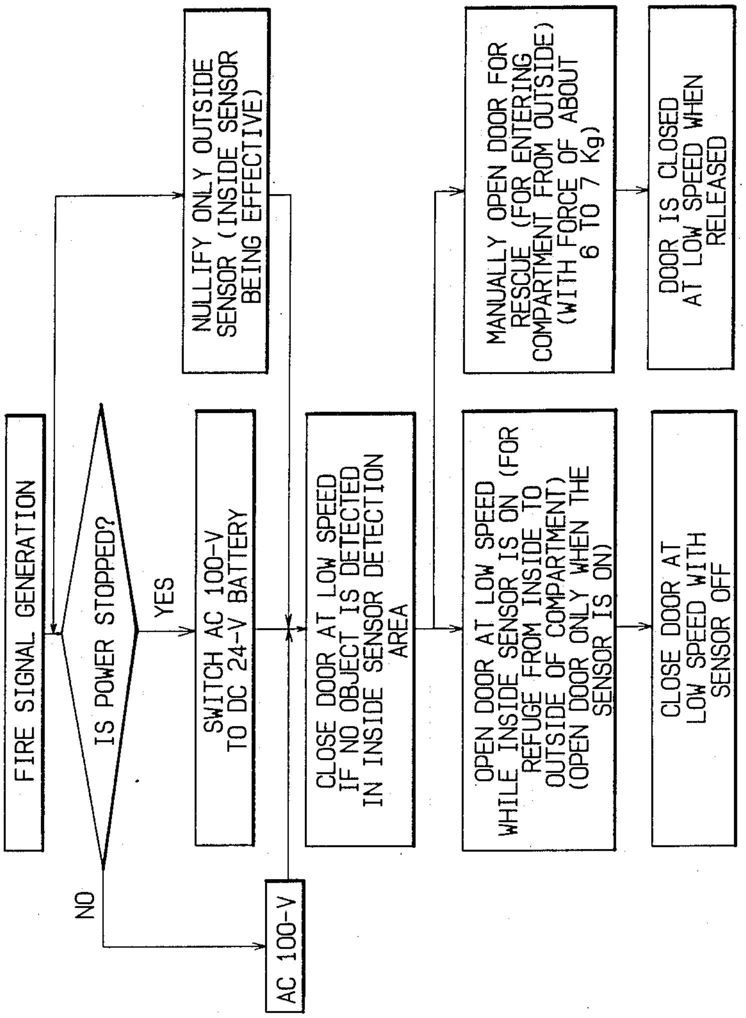

As shown in the flow chart of FIG. 6, upon receipt of a fire signal the automatic door controller 2 switches the automatic door driving to a low-speed low-thrust driving to close the automatic door in the manner as in (3-2).

Figure 8:
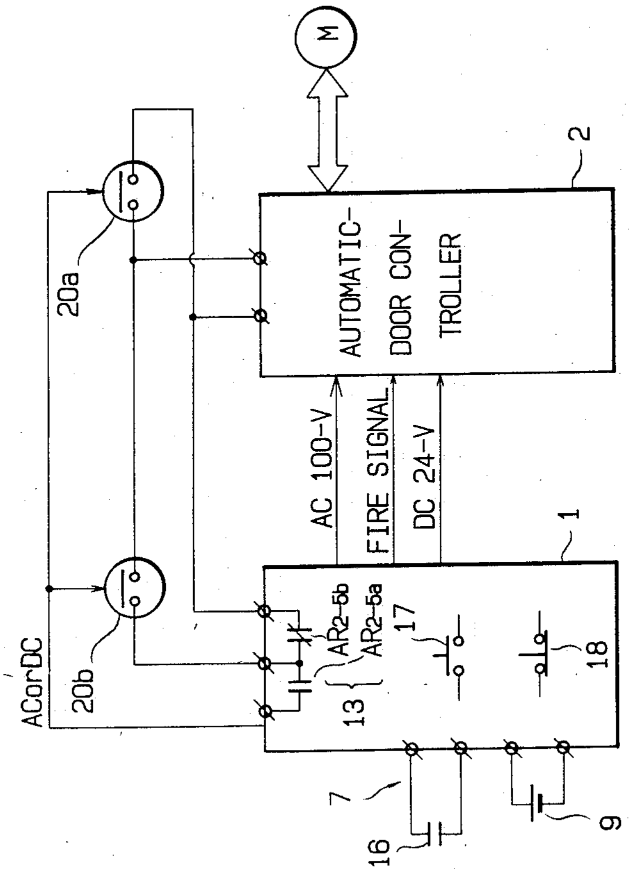

This case is different from the case (3-2) in that when the switch $AR_{2\text{-}5b}$ *is opened, only the outside sensor* 20*b* is rendered inoperative and the inside sensor 20*a* remains operative, as is seen from the wiring of FIG. 8. Thus, if a man in the room intends a refuge, the automatic door is automatically opened by the action of the inside sensor 20*a*, and there is no need of manually opening the door. If a man intends to enter the room for the sake of rescue, the automatic door in a low-speed closing operation is opened manually (with a force of 6 to 7 kg).

I claim:

1. An automatic door driving system, in which an AC power source and a battery power source are connected through an emergency battery unit to an automatic door controller for controlling an automatic door drive motor, also in which normally said automatic door controller is supplied with power from said AC power source for normal operation of an automatic door by said automatic door controller, while power supply from said battery power source to said automatic door controller is inhibited and said battery power source is charged from said AC power source, further in which at the time of power stoppage said emergency battery unit is switched for power supply from said battery power source to said automatic door controller so that said automatic door is subjected to normal operation or operation at the time of power stoppage by said automatic door controller, and still further in which in case of emergency such as occurrence of a fire an external emergency signal is stored so that an emergency operation of said automatic door will be caused according to a predetermined program by said automatic door controller, and said emergency signal and a power stoppage signal are outputted to said automatic door controller, wherein said emergency battery unit includes an AC power source circuit for electrically connecting said AC power source and said automatic door controller to each other, a first relay provided in said AC power source circuit such as to be turned off at the time of power stoppage, a battery power source circuit for electrically connecting said battery power source and said automatic door controller to each other through a switch to be turned on when said first relay is rendered inoperative, a rectifier, a constant current circuit, a switch to be turned on when a fire signal circuit outputs a fire signal, said rectifier, said constant current circuit and said switch being serially provided between said AC power source circuit and said battery power source circuit, a fire signal circuit for outputting a fire signal according to an external situation at the time of occurrence of a fire, a self-holding circuit for holding a fire signal outputted from said fire signal circuit, and various signal output means for providing an operational state of said emergency battery unit to said automatic door controller.

2. The automatic door driving system according to claim 1, wherein a selection switch is connected to said battery power source circuit.

3. The automatic door driving system according to claim 1, wherein said self-holding circuit includes inner and outer reset buttons.

4. The automatic door driving system according to claim 1, wherein said fire signal circuit includes a test button.

5. The automatic door driving system according to claim 1, wherein said signal output means include a power stoppage signal output unit and a fire signal output unit.

* * * * *